(12) United States Patent
Crockett

(10) Patent No.: US 6,939,413 B2
(45) Date of Patent: Sep. 6, 2005

(54) FLUX BINDER SYSTEM

(75) Inventor: Dennis D. Crockett, Mentor, OH (US)

(73) Assignee: Lincoln Global, Inc., Monterey Park, CA (US)

( * ) Notice: Subject to any disclaimer, the term of this patent is extended or adjusted under 35 U.S.C. 154(b) by 0 days.

(21) Appl. No.: 10/457,502

(22) Filed: Jun. 9, 2003

(65) Prior Publication Data

US 2004/0187961 A1 Sep. 30, 2004

Related U.S. Application Data

(63) Continuation of application No. 10/395,509, filed on Mar. 24, 2003, now abandoned.

(51) Int. Cl.[7] ............................................ B23K 35/365
(52) U.S. Cl. ............................... 148/23; 148/24; 148/26
(58) Field of Search ............................... 148/23, 24, 26

(56) References Cited

U.S. PATENT DOCUMENTS

| | | | | |
|---|---|---|---|---|
| 3,620,830 A | * | 11/1971 | Kramer | 219/145.23 |
| 3,857,702 A | * | 12/1974 | Corbett | 75/306 |
| 4,010,309 A | * | 3/1977 | Petersen | 428/386 |
| 4,103,067 A | * | 7/1978 | Jackson et al. | 428/387 |
| 4,131,784 A | * | 12/1978 | Kimura et al. | 219/137 VM |
| 4,512,822 A | * | 4/1985 | Barringer et al. | 148/24 |
| 4,561,912 A | * | 12/1985 | Courtenay et al. | 148/23 |
| 4,662,952 A | * | 5/1987 | Barringer et al. | 148/23 |
| 4,741,974 A | * | 5/1988 | Longo et al. | 428/558 |
| 5,300,754 A | * | 4/1994 | Gonzalez et al. | 219/146.3 |
| 5,308,698 A | * | 5/1994 | Bishel et al. | 428/385 |
| 5,984,161 A | * | 11/1999 | Koch et al. | 228/56.3 |
| 6,613,159 B1 | * | 9/2003 | Koch et al. | 148/26 |

* cited by examiner

*Primary Examiner*—Daniel Jenkins
(74) *Attorney, Agent, or Firm*—Fay Sharpe Fagan Minnich & McKee; Brian E. Turung

(57) ABSTRACT

A welding flux that includes a flux agent and a binder. The binder includes a colloidal binder formed from small particles of silicon dioxide. The binder can be dried at lower temperatures to thereby for a greater range of fluxing agents and/or metal alloys to be included in the welding flux. The colloidal binder can constitute 100 percent of binder or form only part of the binder.

83 Claims, 5 Drawing Sheets

FLUX BINDER SYSTEM

The present invention is a continuation of U.S. application Ser. No. 10/395,509 filed Mar. 24, 2003, now abandoned and claims priority thereon.

The present invention is in the general field of welding flux binders and more particularly directed to a non-hygroscopic welding flux binder formed having a lower setting temperature.

BACKGROUND OF THE INVENTION

In the field of arc welding, the three (3) main types of arc welding are submerged arc welding (SAW), shielded metal arc welding (SMAW), and flux-cored arc welding (FCAW). In submerged arc welding, coalescence is produced by heating with an electric arc between a bare-metal electrode and the metal being worked. The welding is blanketed with a granular or fusible material or flux. The welding operation is started by striking an arc beneath the flux to produce heat to melt the surrounding flux so that it forms a subsurface conductive pool which is kept fluid by the continuous flow of current. The end of the electrode and the work piece directly below it become molten and molten filler metal is deposited from the electrode onto the work. The molten filler metal displaces flux pool and forms the weld. In shielded metal arc welding, shielding is by a flux coating instead of a loose granular blanket of flux. In flux-cored electrodes, the flux is contained within the metal sheath.

In the art of welding, much prior effort has been expended in developing flux compositions of the type having predetermined flux components intended to perform in predetermined manners. A large number of compositions have been developed for use as fluxes in arc welding both for use generally as welding fluxes and for use as a coating on a metallic core or within a sheath. Fluxes are utilized in arc welding to control the arc stability, modify the weld metal composition, and provide protection from atmospheric contamination. Arc stability is commonly controlled by modifying the composition of the flux. It is therefore desirable to have substances which function well as plasma charge carriers in the flux mixture. Fluxes also modify the weld metal composition by rendering impurities in the metal more easily fusible and providing substances which these impurities may combine with in preference to the metal to form slag. Practically all slag-forming compounds may be classed as either acidic or basic, according to which compounds they react with. The substances which are considered to be the most active "bases" are those which are compounds of the elements forming basic compounds in ordinary chemical reactions in water solutions, such as calcium, magnesium, and sodium. The most active "acid" impurities are compounds of silicon, titanium, zirconium and aluminum. Fluxes are prepared with a higher or lower percentage of acidic or basic compounds, depending on the type of metal to be welded and impurities in the metal. In some instances, other materials may be added to lower the slag melting point, to improve slag fluidity, and to serve as binders for the flux particles.

One problem encountered in the welding industry is the absorption of moisture by the flux covering on welding electrodes. During welding, the heat evaporates and dissociates the water, evolving hydrogen gas, which can dissolve into the metal. Under stress, the dissolved hydrogen in the weld metal may produce cracks with the potential for catastrophic failure of the weld. Hydrogen embrittlement is a phenomenon which involves loss of ductility and increased crack susceptibility in steel at room temperature due to the presence of hydrogen in the steel. Hydrogen induced cracking can occur to some extent whenever sufficient hydrogen and stress are present in a hard steel at temperatures above $-100°$ C. and below $150°$ C. As it is almost impossible to avoid producing these stresses in a weld. Methods of crack control usually involve controlling the amount of hydrogen present in the weld, the microstructure of the solidified weld metal, or both. Hydrogen can be introduced into the weld arc atmosphere from a number of sources including oxides, wire contaminants and oil. The primary source of hydrogen is moisture in the flux and flux binder.

Binders are used in granular fluxes and in electrode coatings to hold the components of the flux system together and/or to maintain the desired shape of the electrode coating about the metallic core during normal handling. Most welding flux formulations consist of an oxide-based material (flux) and additives bonded together by sodium silicate and/or potassium silicate (water glass). These types of binders are disclosed in U.S. Pat. Nos. 4,103,0677; 4,131,784; 4,208,563; 4,355,224; 4,741,974 and 5,300,754, all which are incorporated herein by reference. Such binders have been particularly useful because they resist decomposition under conditions of use and because such binders provide adequate strength characteristics in the quantity added to the flux composition for the high rate of extrusion used in the manufacture of electrodes. In addition, the specific properties of either potassium silicate or sodium silicate makes each attractive for the manufacture of welding electrodes. For example, the drying characteristics are such that the liquid silicates used as binders for coating metal electrodes become hard films through the loss of water. The use of silicates in the flux can enhance arc stability during welding. The silicates in the flux provide a low melting point component to the flux which facilitates in adjusting the melting/freezing range of the slag. Silicates are easy to handle and use, thus making desirable for use as flux binders. Silicates are also relatively inexpensive, thus adding little cost to the flux composition. Sodium and potassium silicates have been particularly useful because their properties provide characteristics which are desirable in the manufacture of coated electrodes. With the addition of liquid sodium silicate to a dry powder formulation, the resulting mixture can be kneaded to a consistency that is appropriate for subsequent extrusion. The mass of kneaded mixture is typically formed into "slugs" which facilitates in handling during the time of storage and the loading of presses with the mixture for the extrusion operation. At present, a substantial portion of commercially produced coated electrodes are produced by the extrusion process. The plasticity of the flux coating on the wire electrode is somewhat controlled by the silicate addition in the flux mixture, but may also be influenced by other ingredients such as raw clay or bentonite which may be added or combined with silica or calcined clay. As the electrode is extruded, the electrode becomes reasonably solid and resists flattening as soon as the electrodes leave the die and falls on a conveyor belt. Drying of the extruded flux coating on the wire electrode is carried out at a low temperature beginning at about 100–150° C. with controlled humidity in order to obtain uniform drying of the flux coating without cracking. This drying step is followed by one or more higher temperature drying steps at a lower humidity depending upon the nature of the flux coating. The moisture content of the dried flux coating on the electrode will range from less than 0.2% in some low hydrogen electrodes to as high as 3 to 6 percent in a cellulose type of electrode (e.g. E6010, E6011, etc.).

In high strength, low hydrogen electrodes, sodium silicate and/or potassium silicate binders have not been very satisfactory. Sodium silicate and/or potassium silicate binders are very hygroscopic and require moisture to keep them sound and free from cracks. During welding, the heat evaporates and dissociates the water, evolving hydrogen gas which can dissolve into the weld metal. Under stress, the dissolved hydrogen can produce cracks in the weld metal. The amount of moisture retained by silicate and/or potassium silicate binders is governed primarily by the temperature to which it has been dried. It is known that room temperature air-drying of the silicate is not adequate for films or bonds that are to be used in welding. In an effort to decrease the possibility of failure, the presently available welding electrodes are baked at 370–540° C. or greater to decrease the water in the flux to less than 0.2%. The maintenance of this degree of dryness has been important in the welding of higher strength materials, and such maintenance necessitates careful handling to avoid hygroscopic moisture pickup during the use of these electrodes. Although moisture pickup has not been particularly troublesome in coatings for lower strength weld metal, the hygroscopic characteristics of the present day low hydrogen coatings has made it mandatory to use heated ovens to maintain the dryness of the flux coating to restrict the pick up of moisture. For high strength welds, the hygroscopic nature of the silicates in the flux coatings has been particularly damaging since, for example, in the EXX 18 type of electrodes, the moisture content must be kept at a level below 0.2 percent. As a result, these electrodes can only be used for a limited time before the fluxes absorb moisture from the air and thus have to again be baked to reduce the moisture content. Some in the art are of the opinion that low hydrogen electrodes can not be successfully rebaked at low temperatures, to sufficiently reduce the moisture content of the flux coating. As such, some skilled in the art are of the opinion that the most appropriate way to avoid hydrogen absorption by the weld metal is to keep the moisture content of the flux coating to a minimum after being initially dried. As a result, stringent controls have been placed on the moisture levels of the low hydrogen electrode.

A problem in addition to that of water absorption by these weld fluxes, especially submerged arc fluxes, is their lack of $CO_2$ containing compounds during welding. Compounds containing $CO_2$ are added to some submerged arc fluxes to generate $CO_2$ during welding. These $CO_2$ containing compounds can enhance the operability of the flux by increasing the stability of the arc and by excluding or reducing atmospheric contamination, particularly $N_2$, from the weld metal. Baking the flux at temperatures about 540° C. tends to decompose sources of $CO_2$ in the flux, such as calcium carbonate. As a result, the drying times for the flux composition has to be reduced so as not to expel the $CO_2$ from the flux when a certain $CO_2$ content is desired; however, the reduced drying time results in increased moisture content of the flux, and less setting time for the flux.

Another problem with baking the fluxes at 540° C. or greater to remove moisture is that several flux components, such as metallic powders, which may be added to provide alloying of the weld metal, will oxidize during the baking operation (e.g. Al, Mg, Ti, etc.). Metal powders are added as required for alloying with the various types of metals or steels to be welded. Fluorides may be added to lower the viscosity of the flux at operating temperature thereby altering the fluidity of the molten flux on the steel. Flexibility in choosing the type of metal powders to be added to the flux rather than changing the composition of the steel rod decreases the cost of the welding electrodes. In addition, some materials that are included in the flux system react with the silicate at high temperatures (e.g., kaolin, etc.).

Several flux binders have been developed to address the problems associated with sodium silicate and/or potassium silicate binders. Two of these binders are disclosed in U.S. Pat. Nos. 4,103,067 and 4,662,952, both of which are incorporated herein by reference. The '952 patent discloses a welding flux binder hydrolyzed and polymerized from a mixture of tetraalkylorthosilicate, $Si(OR)_4$, wherein R is $—CH_3$, $—C_2H_5$ or $—C_3H_7$, alkali and alkaline earth salts. The welding flux made with this binder comprises an alkali-alkaline earth silicate, $M_2O.M'O.SiO_2$, wherein M is lithium, sodium, potassium, or other element in Group I of the Periodic Table and M' is magnesium, calcium, barium, or other element in Group II of the Periodic Table and may further comprise metal compounds. Tetraalkylorthosilicate is an organometallic precursor to a ceramic binder. The organic portion is removed during processing of the weld flux binder and is not present in the final product. Unlike sodium silicate and/or potassium silicate binders, the binder contains a homogeneous distribution of alkali and alkaline earth ions and is not hygroscopic. This is a result of the use of tetraalkylorthosilicate and the presence of compounds which react to form CaO, MgO, BaO, or other alkaline earth oxides. The oxide compounds, particularly calcium compounds, act as stabilizing agents and make the fired binder non-hygroscopic. Alkali compounds, particularly potassium, significantly reduce the viscosity of the glass, lowering the temperature required to sinter the binder to about 500–1100° F. The '067 patent discloses a binder of hydrolyzed organic silicate (such as ethyl silicate) which makes no substantial contribution to the moisture level and which makes the covering resistant to hygroscopic moisture pickup prior to welding. Hydrolyzed ethyl silicate binder reduces the hygroscopicity of the flux. The hydrolyzed organic silicate binder can be used either as a replacement or a supplement for the sodium silicate or potassium silicate binder. As a result, with proper drying in an inert gas protected atmosphere up to 537° C., the hydrolyzed ethyl silicate converts to silica with no moisture which results in a lower moisture content for the flux. In addition, the pickup of moisture by the binder is restricted so that these electrodes may be used for longer periods than ordinary shop practice without excess pick up of moisture.

Although these binders have addressed, some of the moisture pickup problems associated with sodium silicate and/or potassium silicate binders, the binder disclosed in the '952 patent still requires high temperatures to set the binder. The binder disclosed in the '067 patent, though having a lower set temperature, introduces hydrogen in the flux by the use of an organic binder. Such added hydrogen can be detrimental when attempting to obtain extremely low hydrogen levels in the weld metal. In view of the prior art binders, there remains a need for a binder that has low hygroscopicity, a low set point temperature and which does not introduce hydrogen to the flux system.

SUMMARY OF THE INVENTION

The present invention pertains to welding fluxes, and more particularly, to a welding flux binder that resists water absorption and which can be used to bind a wide variety of fluxing components and/or metal alloying agents. The flux system which incorporates the use of a novel binder of the present invention can be used in all types of welding, such as submerged arc welding and shielded metal arc welding. The flux system can be coated on a welding electrode, be inserted into the core of a metal electrode, and/or formed into a granular flux. The novel binder of the present invention addresses the problem of past flux systems concerning the high temperatures needed to set such prior flux binders and the problem associated with moisture absorption of the flux system after the flux binder has been dried. The flux system which incorporates the novel binder of the present invention also overcomes the problem associated with the uniformity of pouring of the flux system onto a workpiece during a submerged arc welding process and/or the uniformity of pouring a flux system onto an electrode prior to forming the electrode into a flux cored electrode. The novel binder of the present invention incorporates the use of a colloidal binder that successfully binds with a variety of flux agents and/or metal alloying agents in a flux system. The colloidal binder can be dried and set at substantially lower temperatures than prior silicate binder systems. Once the colloidal binder has been dried and set, the novel binder resists the absorption of moisture thereby maintaining a low moisture content of the flux system over extended periods of time. The lower drying and setting temperatures of the novel binder also allows for an expanded number of flux components to be used in the flux system. Prior fluxing systems could not be dried at temperatures exceeding 649° C. for extended periods of time if the flux system included carbonates and/or certain types of metal alloys such as, but not limited to, aluminum, magnesium, and titanium. At drying temperatures above 649° C., the carbonate compounds would break down over time, thereby releasing the carbon dioxide which was to be used as a shielding gas during a welding operation. The high drying temperatures also resulted in oxidation of certain alloying metals, thus preventing the use of such metals as alloying agents in the weld metal during a welding process. The lower drying and setting temperatures of the novel binder of the present invention allows for the use of carbonates in the flux system, as well as the use of an expanded number of metal alloying agents in the flux system.

In one aspect of the present invention, the novel welding flux binder of the present invention includes a colloidal binder formed from one or more metal oxides. The colloidal binder can make up all of the flux binder in the flux system or constitute only a portion of the flux binder of the flux system. In one embodiment of the invention, the metal oxide which forms the colloidal binder includes silicon dioxide. The silicon dioxide can be in a pure and/or unpure form. Examples of unpure forms include, but are not limited to, quartz, feldspar, mica, biotite, olivine, homblende, muscovite, pyroxenes, and/or other sources of silicon dioxide. In one aspect of this embodiment, at least about 5% of the silicon dioxide in the colloidal binder is a pure form of silicon dioxide. One such source of pure silicon dioxide is sold as Indusil 508 by Kemira Chemicals. In another and/or alternative aspect of this embodiment, typically at least about 10% of the silicon dioxide in the colloidal binder is pure silicon dioxide, more typically at least about 20% of the silicon dioxide in the colloidal binder is pure silicon dioxide, still more typically at least about 30% of the silicon dioxide in the colloidal binder is pure silicon dioxide, even more typically at least about 40% of the silicon dioxide in the colloidal binder is pure silicon dioxide, still even more typically at least about 50% of the silicon dioxide in the colloidal binder is pure silicon dioxide, more typically at least about 60% of the silicon dioxide in the colloidal binder is pure silicon dioxide, even more typically at least about 70% of the silicon dioxide in the colloidal binder is pure silicon dioxide, still more typically at least about 80% of the silicon dioxide in the colloidal binder is pure silicon dioxide, still even more typically at least about 90% of the silicon dioxide in the colloidal binder is pure silicon dioxide, yet even more typically about 100% of the silicon dioxide in the colloidal binder is pure silicon dioxide. In another and/or alternative embodiment of the present invention, the average particle size of the solid particles in the colloidal binder are selected to be sufficiently small to achieve the binding effect of the colloidal binder. It has been found that when sufficiently small particles are used, a chemical binding effect, believed to be due to a Brownian effect, on the surface of the particles results in the binding together of one or more of the flux components by the colloidal binder. In one aspect of this embodiment, the average particle size of the particles in the colloidal binder are less than about 100 nm, and typically less than about 70 nm, more typically less than about 60 nm, still more typically less than about 50 nm, even more typically less than about 40 nm, still even more typically less than about 30 nm, more typically less than about 20 nm, yet even more typically less than about 10 nm, and still yet even more typically about 0.5–10 nm. In one non-limiting design, the average particle size of the solid particles in the colloidal binder are about 1–30 nm, typically about 2–25 nm, more typically about 5–15 nm, and even more typically about 5–10 nm. In another and/or alternative aspect of the present invention, the colloidal binder has a liquid component and a solid particle component. Generally, the liquid component primarily includes water; however, additional and/or alternative liquids can be used. The liquid is used to suspend the solid particles so as to allow the solid particles to bind the components in the flux system during the drying of the wetted flux system. In one embodiment of the invention, the liquid is substantially absent any hydrocarbon compounds. The introduction of hydrocarbon compounds in the liquid system can introduce hydrogen to weld metal during a welding process. In some flux systems, the reduction or elimination of hydrogen from the flux system is required to achieve the desired weld pool properties during a welding process. In one aspect of this embodiment, the liquid contains less than about 10% hydrocarbon compounds, typically less than about 5% hydrocarbon compounds, more typically less than about 2% hydrocarbon compounds, and even more typically less than about 0.05% hydrocarbon compounds. In another and/or alternative embodiment of the invention, the solid particles in the colloidal binder generally constitutes less than about 90% of the total weight of the colloidal binder prior to the drying of the colloidal binder. In one aspect of this embodiment, the solid particles constitute less than about 60% of the total weight of the colloidal binder, typically less than about 50% of the total weight of the colloidal binder, more typically less than about 45% of the total weight of the colloidal binder, still more typically less than about 40% of the total weight of the colloidal binder, yet even more typically no more than about 35% of the total weight of the colloidal binder, still more typically about 5–35% of the total weight of the colloidal binder, even more typically about 10–35% of the total weight of the colloidal binder, still more typically about 15–35% of the total weight of the colloidal binder, still more typically about 20–35% of the total weight of the colloidal binder, and still more typically about 25–35% of the total weight of the colloidal binder.

In still another and/or alternative aspect of the present invention, the colloidal binder can comprise 100% of the binder of the flux system or constitute a fraction of the binder of the flux system. When the colloidal binder represents a fraction of the binder system, the colloidal binder is mixed with other binders. Such other binders can include, but are not limited to, water glass (potassium silicate and/or sodium silicate), boric acid, borox, soluble carbonates, nitrates, oxillates or oxichlorides, various types of resins, sugar, starch, agar, and/or the like. In one embodiment of the invention, the colloidal binder, when constituting a fraction of the total binder, is generally combined with water glass. When the colloidal is combined with the water glass, these two components typically constitute a majority of the binder, and more typically constitute at least about 60% of the binder, even more typically constitute at least about 70% of the binder, still even more typically constitute at least about 80% of the binder, yet even more typically constitute at least about 90% of the binder, still yet even more typically constitute about 100% of the binder. In another and/or alternative embodiment, when the colloidal binder constitutes a fraction of the total binder, the colloidal binder constitutes at least about 5% of the total binder, typically at least about 10% of the total binder, more typically at least about 20% of the total binder, still even more typically at least about 30% of the total binder, yet even more typically at least about 40% of the total binder, still yet even more typically at least about 50% of the total binder, even more typically at least about 60% of the total binder, still even more typically at least about 70% of the total binder, yet even more typically at least about 80% of the total binder, still yet even more typically at least about 90% of the total binder, and yet even more typically at least about 95% of the total binder.

In yet another and/or alternative aspect of the present invention, the novel binder of the flux system is formulated such that the novel flux binder can be dried and set at lower temperatures so as not to adversely affect one or more components of the flux system. Many prior art binder systems required the binder to be set at temperatures exceeding 650° C. (1200° F.) for extended periods of time. Such high temperatures typically resulted in the oxidation of several of the metal alloys in the flux system and/or caused the release of carbon dioxide from one or more carbonates in the flux system. The release of carbon dioxide from the flux system resulted in less shielding gas being generated by the flux system during welding. The oxidation of one or more metal alloys in the flux system resulted in the oxidized metal alloy not being alloyed in the weld metal, thus producing a less than desired weld metal composition. Reducing the temperature and/or time of drying of these prior flux systems reduce the amount of carbon dioxide release from these flux systems and/or the amount of oxidation of the metal alloys in these flux systems; however, such temperature reduction and/or drying time resulted in the binder of these prior flux systems not being fully or properly set during the drying process. Such improper setting or drying of these prior flux systems resulted in a higher moisture content of the flux system and/or resulted in a greater degree of moisture absorption by the flux system during storage. The improper setting of the binder also resulted in the inferior binding together of the components of the flux system. Several alternative binder systems have been proposed which include organic compounds which are able to be set at lower temperatures; however, such organic compounds introduce hydrogen to the flux system which may be undesirable in certain welding applications. The novel flux binder of the present invention overcomes the past problems of these prior flux systems by utilizing a unique binder system which dries and sets at substantially lower temperatures than past binders, and which does not require the inclusion of hydrocarbon components to set the binder at such lower temperatures. In addition, the novel binder can be dried to substantially eliminate the moisture content of the flux system and to maintain a low moisture content of the flux system over an extended period of time. In one embodiment of the present invention, the flux system is heated to a temperature of less than about 760° C. (1400° F.) during the drying and setting process of the binder in the flux system. The heating of the flux system to an elevated temperature is used to reduce the moisture content in the flux system and/or to set the binder of the flux system. Reduction in the moisture content of the flux system is desirable, since water, as a source of hydrogen, can adversely affect the properties of the weld metal during particular types of welding operations. Low moisture content of the flux system is particularly desirable in the formation of weld beads for high-strength steel. However, there are other welding applications wherein the moisture content of the flux can be significantly higher for desirable weld beads. In one aspect of this embodiment, the temperature that the flux system is exposed to a temperature during the drying and/or setting procedure that is less than about 705° C. (1 300° F.), typically less than about 650° C. (1200° F.), even more typically less than about 594° C. (1100° F.), still even more typically less than about 538° C. (1000° F.), and still yet even more typically less than about 482° C. (900° F.). As can be appreciated, significantly lower temperatures during and/ or setting temperatures can be used. In another and/or alterative embodiment the drying and/or setting time of the novel binder in the flux system at temperatures above about 250° C. (480° F.) is less than about 10 hours to obtain a moisture content of less than about 1 weight percent. In one aspect of this embodiment, the drying and/or setting time of the novel binder in the flux system at temperatures in excess of about 400° C. (750° F.) is less than about 8 hours, more typically less than about 5 hours, and even more typically less than about 4 hours. As can be appreciated, shorter and/or longer drying and/or setting times of the novel binder in the flux system can be used. Such time periods typically depend on the temperature at which the flux system is exposed, the water content of the flux system, the set time for the binder, and/or the desired moisture content of the flux system after the flux system has been dried. In another and/or alternative embodiment of the present invention, the moisture content of the flux system after the drying and/or setting of the flux system is typically less than about 6 weight percent, more typically less than about 3 weight percent, yet more typically less than about 1 weight percent, still more typically less than about 0.5 weight percent, and even more typically less than about 0.2 weight percent. The moisture content of the flux system after the drying and/or setting process will typically depend on the type of arc welding process being used. Flux systems used in high-strength steel welding processes wherein the hydrogen content is desired to be at extremely low levels, the moisture content of the flux system is typically less than about 1%, more typically less than about 0.4%, even more typically less than about 0.2%, and still even more typically less than about 0. 15%.

In still yet another and/or alternative aspect of the present invention, the novel binder used in the flux system of the present invention exhibits improved pouring characteristics over past flux systems. After the flux system has been dried and/or set, the flux system is typically ground and then screened for use in submerged arc welding processes and/or for use in a flux cored electrode. Typically, the flux system is ground and then screened to obtain an average particle size of the flux system of less than about 48 mesh, more typically less than about 80 mesh, and still even more typically less than about 100 mesh. In a submerged arc welding process, the ground flux system is typically poured into a groove of a workpiece and then subjected to an electric arc as a metal rod is melted to form the weld metal. As the flux system is being poured onto the workpiece during a submerged arc welding process, a certain amount of flux system is needed to obtain the desired shielding and/or flux properties during the welding process to obtain the desired weld bead quality. In the past, various types of ground flux systems did not uniformly pour, thus created problems with the uniformity of the weld bead quality during a welding process. Similarly, when a flux cored electrode is being formed, a certain amount of ground flux is deposited onto the electrode prior to the electrode being shaped into a cored electrode, wherein the flux system fills the cored region of the electrode. The uniformity of the flux system being poured onto the electrode is important so as to maintain a uniform amount of flux in the cored region throughout the longitudinal length of the wire. Past ground flux systems have encountered difficulties in such pouring uniformity, thereby adversely affecting the quality of the flux cored electrode. It has been found that the use of the colloidal binder in the flux system results in a ground flux system having improved flowability during the pouring of the flux in a submerged arc welding operation and/or by pouring the flux system onto an electrode for the formation of a flux cored electrode. As such, the flux system of the present invention overcomes the flowability problems of past flux systems.

It is a principal object of the present invention to provide an improved flux system in accordance with the present invention which includes a colloidal binder.

Another and/or alternative object of the present invention is the provision of an improved flux system that requires lower drying and/or setting temperatures, thereby providing a greater flexibility of the types of components that can be used in the flux system.

Still another and/or alternative object of the present invention is the provision of a flux system which resists moisture pickup for an extended period of time after the flux system has been dried and/or set.

A further and/or alternative object of the present invention is the provision of a flux system which exhibits improved flowability properties after the flux system has been ground.

Still a further and/or alternative object of the present invention is the provision of a flux system which includes a colloidal binder in combination with another binder to provide a flux system having lower set temperature, improved flowability, and/or reduced moisture pickup over time.

Yet a further and/or alternative object of the present invention is the provision of a flux system which includes a colloidal binder, which flux system can be used in a submerged arc welding process, can be coated onto an electrode, and/or can be used in the core of a flux cored electrode.

Still yet a further and/or alternative object of the present invention is the provision of a flux system which includes a binder that chemically binds together one or more components of the flux system.

Another and/or alternative object of the present invention is the provision of a flux system which can be extruded on a metal electrode to form a coated metal electrode.

These and other objects and advantages will become apparent from the discussion of the distinction between the invention and the prior art and when considering the preferred embodiment as shown in the accompanying drawings.

BRIEF DESCRIPTION OF THE INVENTION

Figure 1:
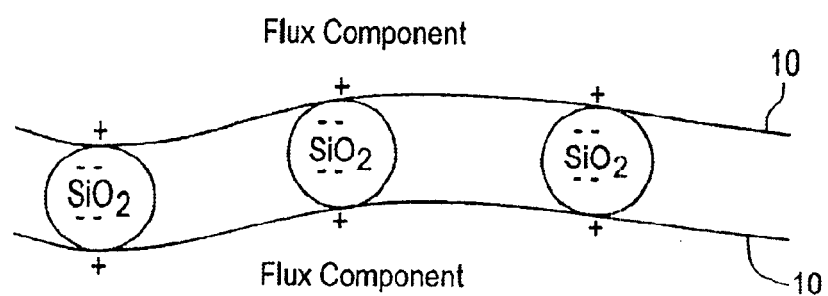
FIG. 1 is a illustration of small $SiO_2$ particles of a colloidal binder system of the present invention bonding together portions of two flux components of a welding flux system.

Referring now in greater detail to the drawings, wherein the showings are for the purpose of illustrating preferred embodiments of the invention only, and not for the purpose of limiting the invention, FIG. 1 illustrates the use of small particles of silicon dioxide to bind together various components of a welding flux system. The components of the flux system typically include metal oxides (e.g., aluminum oxide, boron oxide, calcium oxide, chromium oxide, iron oxide, magnesium oxide, niobium oxide, potassium oxide, silicon dioxide, sodium oxide, tin oxide, titanium oxide, vanadium oxide, zirconium oxide, etc.), metal carbonates (e.g., calcium carbonate, etc.), metal fluorides(e.g., barium fluoride, bismuth fluoride, calcium fluoride, potassium fluoride, sodium fluoride, Teflon, etc.), and/or metal alloying agents (e.g, aluminum, boron, calcium, carbon, iron, manganese, nickel, silicon, titanium, zirconium, etc.). The particular components of the flux system typically depend on the type of welding process (SAW, SMAW, FCAW) to be used and/or the type of workpiece to be welded.

As illustrated in FIG. 1, the particles of silicon dioxide are substantially smaller than the particles 10 of flux components. FIG. 1 represents three small particles of silicon dioxide positioned between a small fraction of the surface of two flux components. The silicon dioxide can be from pure or unpure sources. Typically, a majority of the silicon dioxide is from a pure source. Typically the particles of silicon dioxide have an average particle size of about 2–25 nanometers, and more typically an average particle size of about 8 nanometers. The average particle size of the flux components is typically about 400 mesh (37 microns) or greater. As such, the particle size of the silicon dioxide is generally substantially smaller than the other components of the flux system. For instance, a flux component having an average particle size of about 400 mesh would be about 4625 times larger than a particle of silicon dioxide having an average particle size of about 8 manometer. The binding mechanism by the silicon dioxide is believed to be chemical in nature. It is believed that the small silicon dioxide particles are attracted to the flux components by a Brownian force. As illustrated in FIG. 1, the silicon dioxide particles have a negative charge and are attracted to the positively charge surface of flux components 10. As such, the small silicon dioxide particles bind differently to the flux components than traditional binders which entrap the flux components between the binder particles. The small silicon dioxide particles chemically bind with any adjacent positively charged flux components (e.g., alkali and/or alkaline earth metal compound). The binding of the small negatively charged particles with positively charged metal oxides can result in a reduction in the hydrolyzation of such oxides.

Figure 2:
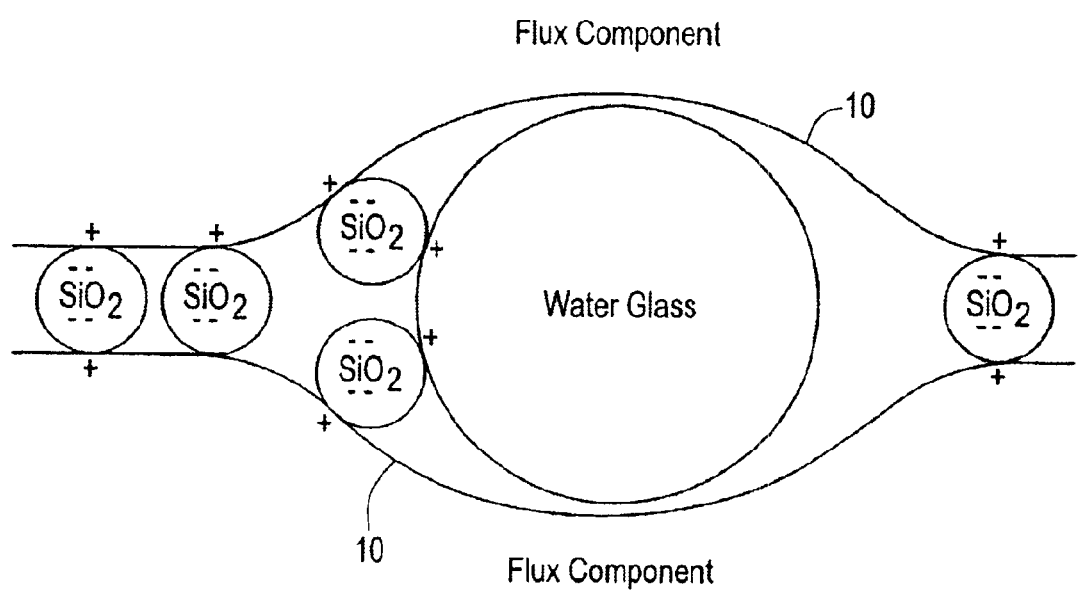
FIG. 2 is a illustration of small $SiO_2$ particles of a colloidal binder system of the present invention and water glass bonding together portions of two flux components of a welding flux system.

Referring now to FIG. 2, a binder in the form of small particles of silicon dioxide and a traditional binder of water glass is used to binder together a surface region of two flux components. The particle of water glass is illustrated as being significantly larger than the particles of silicon dioxide. Typically, the water glass particle is at least over 100 times larger than the particles silicon dioxide. The mechanism for binding by the water glass particles is the entrapment of the flux components between multiple particles of water glass. As stated above, the believed binding mechanism for the small particles of silicon dioxide is a electrical attraction from the Brownian effect. It has been found that both types of binders can be used together to successfully binder together flux components. When the small silicon dioxide particles are used in combination with water glass particles, the combination of the water glass and silicon dioxide particles constitute at least about 70 weight percent of the binder, and typically at least about 90 weight percent of the binder in the flux system.

Figure 3:
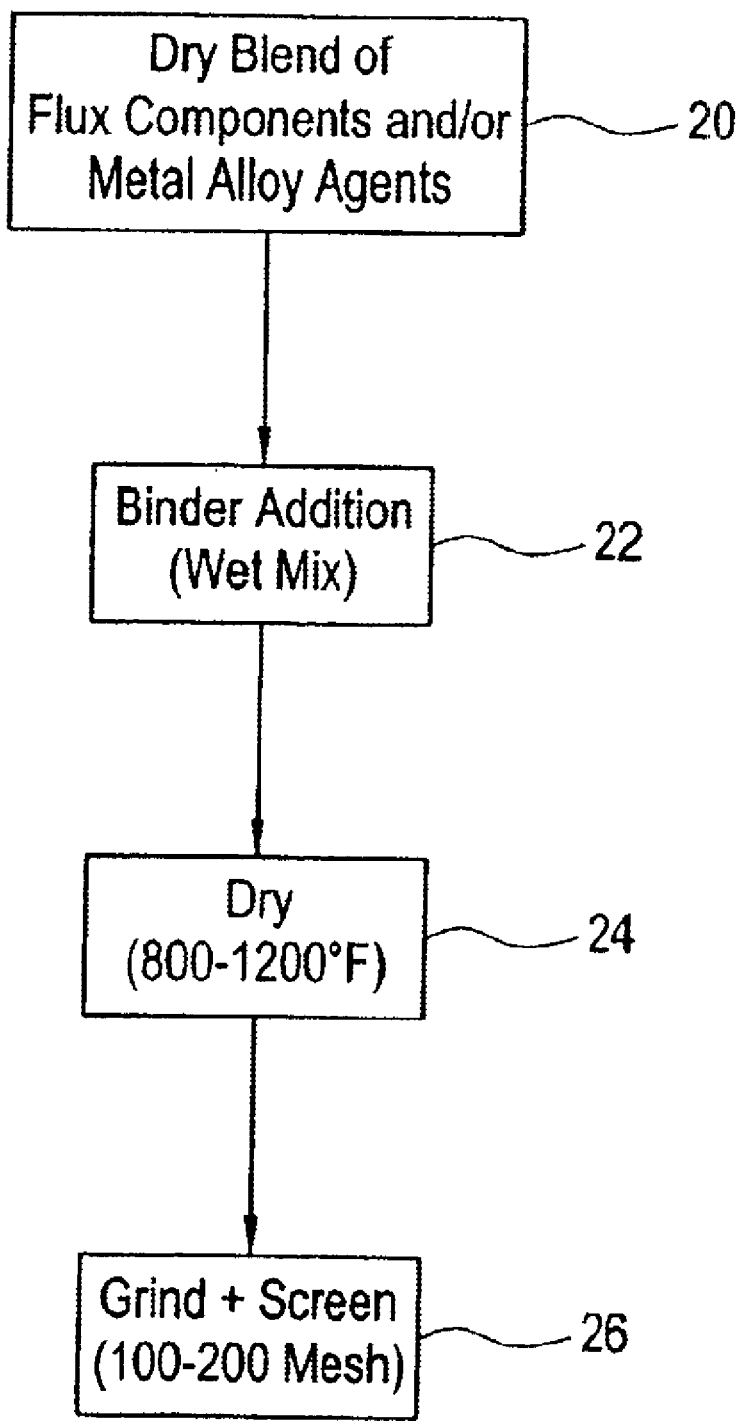
FIG. 3 illustrates a flowchart for making the flux system of the present system for use in submerged arc welding and/or flux cored electrodes.

Referring now to FIG. 3, a process of forming a flux system for use in submerged arc welding or for a filling the core of a flux cored electrode is illustrated. A dry blend of flux components and/or metal alloying agents 20 is prepared or obtained. The size of the flux components and/or metal alloying agents is adjust as desired. Typically, the average size of the flux components and/or metal alloying agents is about 100–400 mesh. The flux components and/or metal alloying agents are then mixed with a wet binder 22 to form wet mix. As can be appreciated, the flux components can be first mixed with the binder and then metal alloying agents, or the metal alloying agents can be first mixed with the binder and then the flux components, or any other mixing order. The binder includes a colloidal binder having small particles of silicon dioxide. The small particles in the colloidal binder can include all or a portion of silicon dioxide particles. Typically, over 80 weight percent of the small particles in the colloidal binder are silicon dioxide particles. The average particle size of the small particles in the colloidal binder are typically about 2–25 nanometers, and more typically about 8 nanometers. The liquid component of colloidal binder typically constitutes about 60–85 weight percent of the colloidal binder, and more typically about 70 weight percent of the colloidal binder. The liquid is typically water; however, other and/or additional liquids can be used. The binder can be made up of 100 weight percent colloidal binder to form a binder arrangement similar to that illustrated in FIG. 1, or can be made of part colloidal binder and part one or more other binders to form a binder arrangement similar to that illustrated in FIG. 2. When the colloidal binder is combined with one or more another binders, the other binder typically includes water glass. The colloidal binder can constitute anywhere from about 0.01–99.99 weight percent of the binder when forming a fraction of the binder. When the binder is formed principally of water glass and colloidal binder, the colloidal binder typically forms about 5–75 weight percent of the binder and more typically about 20–50 weight percent of the binder.

The use of water glass in the flux binder has several advantages that include, but are not limited to:

The water glass components ($Na_2O$ and/or $K_2O$) enhance arc stability

The water glass provide a low melting component to the flux system which is helpful in adjusting the melting/freezing range of the slag during welding.

The water glass is easy to handle and use

The water glass is a low cost material

A flux system that solely uses a colloid as the binder or a colloid in combination with a water glass as the binder overcomes many of the past problems of flux systems which solely used water glass as a binder, such as, but not limited to:

When the water glass is not properly set at high temperatures ($\geq 1400°$ F.), the flux system will absorb moisture significant amounts of moisture The water glass required high setting temperature thus limiting the type of components that can be used in the flux system The water glass included potassium and/or sodium which can be undesirable in some flux system formulations High production of hexavalent chromium fume is produced when welding stainless steel wherein the flux binder included substantial amounts of water glass A coarser granule size of the ground flux system was required when the binder was water glass Once the binder and the flux components and/or alloying agents have been properly mixed together, the wet mix is dried in drying step 24. The wet mix can be dried by any conventional arrangement (e.g. oven, etc.). The drying temperature is typically about 800–1200° F. (426–649° C.); however, higher or lower temperatures can be used. When the flux system includes carbonates, aluminum metal, magnesium metal and/or titanium metal, the drying temperature typically does not exceed about 1200° F. (649° C.) so as to reduce the amount of carbon dioxide disassociated from the carbonates and/or reduce the amount of oxidation of the aluminum metal, magnesium metal and/or titanium metal. The drying temperature for the binder can be as low as 200–600° F. so as to drive off the moisture in the wet mixture yet still achieves a desired amount of binding of the flux system. The flux system is dried until the desired or acceptable moisture content is obtained. For flux systems used in high strength welding, the moisture content is the flux system is typically reduced and maintained below about 0.2 weight percent.

Once the flux system as been dried, the flux system is ground and then screen to obtain an average particle size of the flux system of about 32–200 mesh; however, other average particle sizes can be used. The grinding and screen process 26 is performed by standard techniques, thus will not be further described. The flux system containing the colloidal binder can be ground to finer or smaller particles sizes than compared to prior flux systems using binders such as water glass, molasses, etc.

Figure 5A:
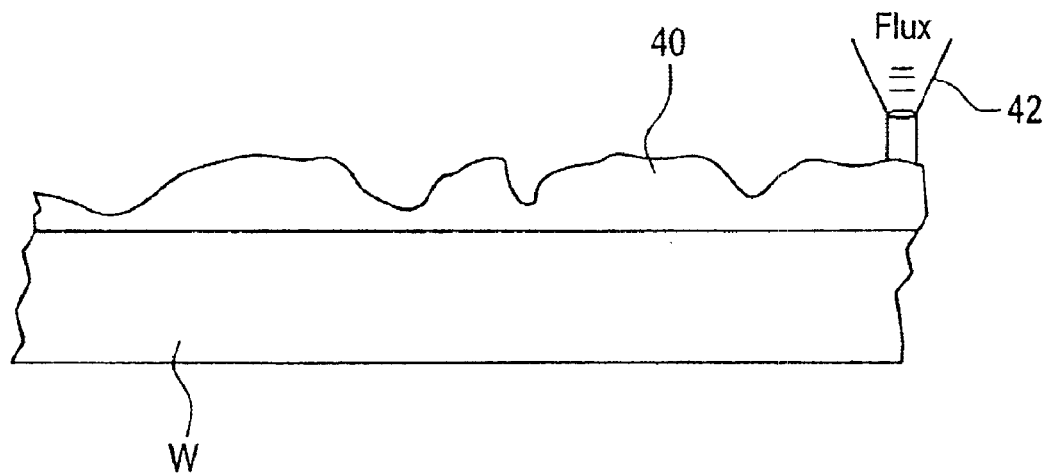
FIGS. 5A & 5B illustrate the pouring of a prior art flux system and the pouring of a flux system of the present invention onto a workpiece for use in submerged arc welding; and, FIG. 6 is a graphical illustration of the moisture pickup of various flux systems that contain or are absent the novel flux binder of the present invention.
Figure 5B:
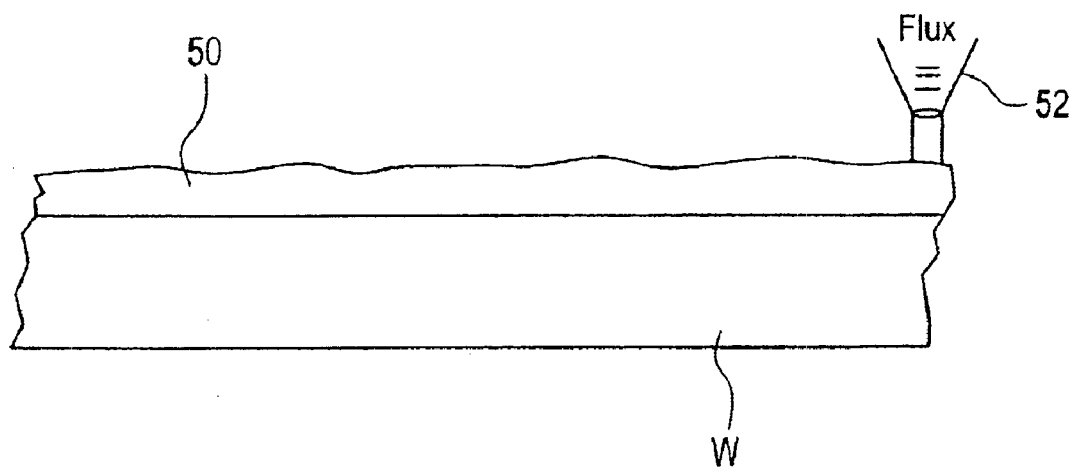

The flux system formed by the process illustrated in FIG. 3 can be used as a submerged arc flux or be included in the core of a flux cored electrode. The flux system containing the colloidal binder has been found to have improved flowability properties as compared to prior art binder systems such as flux systems bound with water glass. As illustrated in FIG. 5A, a prior art flux system is dispensed in a pile 40 onto a workpiece W by dispenser 42. Such as operation typically occurs in a submerged arc welding system wherein the flux system is applied to a workpiece W to be welded and an electric arc is then struck to melt a consumable wire electrode and the flux system. The flux system is piled on the workpiece in a sufficient amount to effect the desired shielding and/or protection of the weld pool from the atmosphere, to modify the properties of the weld metal, etc. If an improper amount (i.e., too little or too much) flux system is applied to the workpiece, undesired characteristics of the weld metal can occur. As illustrated in FIG. 5A, past flux systems did not uniformly flow from the dispenser, thus resulting in an uneven pile of flux system on the workpiece. A flux system that includes the colloidal binder of the present invention exhibits improved flowability. As illustrated in FIG. 5B, the flux system flow is substantially uniform from dispenser 52 to form a substantially uniform pile 50 of flux system on workpiece W. Similar advantages of uniformity of flow are applicable to the formation of flux cored electrodes.

Table A illustrates the results of moisture pickup of several flux systems that include a colloidal binder to several flux system that utilize a standard water glass binder.

TABLE A

|  | MPU @ 80/80[1] | | 900° F. H$_2$O | | | % CO$_2$ | |
| --- | --- | --- | --- | --- | --- | --- | --- |
|  | 24 Hour | 7 Day | As Rec'd[2] | After 24 hours @ 80/80 | After 7 days @ 80/80 | As Rec'd | After 7 days @ 80/80 |
| Oerlikon OP121TT | 0.11 | 0.34 | 0.014 | 0.064 | 0.173 | — | 1.171 |
| Lincoln 880M | 0.16 | 0.64 | 0.017 | 0.095 | 0.297 | 0.501 | 0.692 |
| Lincoln 761 | 0.21 | 0.35 | 0.017 | 0.141 | 0.123 | 0.040 | 0.139 |
| Lincoln 860 | 0.06 | 0.12 | 0.018 | 0.029 | 0.062 | 0.110 | 0.088 |
| Experimental DCX6 | 0.02 | 0.06 | 0.014 | 0.024 | 0.039 | 0.220 | 0.209 |
| Experimental DCX7 | 0.04 | 0.12 | 0.013 | 0.031 | 0.074 | 0.285 | 0.256 |
| Experimental DCX8 | 0.06 | 0.23 | 0.014 | 0.048 | 0.141 | 0.146 | 0.227 |
| Experimental DCX9 | 0.02 | 0.05 | 0.009 | 0.027 | 0.027 | 0.124 | 0.146 |

The fluxes identified as Oerlikon OP121TT, Lincoln 880M, Lincoln 761, and Lincoln 860 are commercially available flux systems that include water glass as the principle binder. The fluxes identified as Experimental DCX 6, Experimental DCX 7, Experimental DCX 8, and Experimental DCX 9 are flux systems similar to one or more of the standard fluxes identified above, except that the content of the alloying agents has been modified. Experimental DCX 6, Experimental DCX 7, and Experimental DCX 9 include a binder that contains ⅓ colloidal silica and ⅔ water glass. Experimental DCX 8 is the same as Experimental DCX 7, but the binder does not include any colloidal silica. All the fluxes identified above are submerged arc welding fluxes and were screened at −20+40 mesh, and subsequently reconditioned for one hour prior to humidification at 80° F., 80% relative humidity. In addition, all the fluxes set forth above were reconditioned for one hour at 900° F. prior to testing at 900° F. As received indicates the flux system after being reconditioned, but before humidification. All the experimental fluxes were dried at a temperature of about 1250° F. The flux systems that included the colloidal binder exhibited acceptable levels of breakdown as compared with commercially available flux systems.

Figure 6:
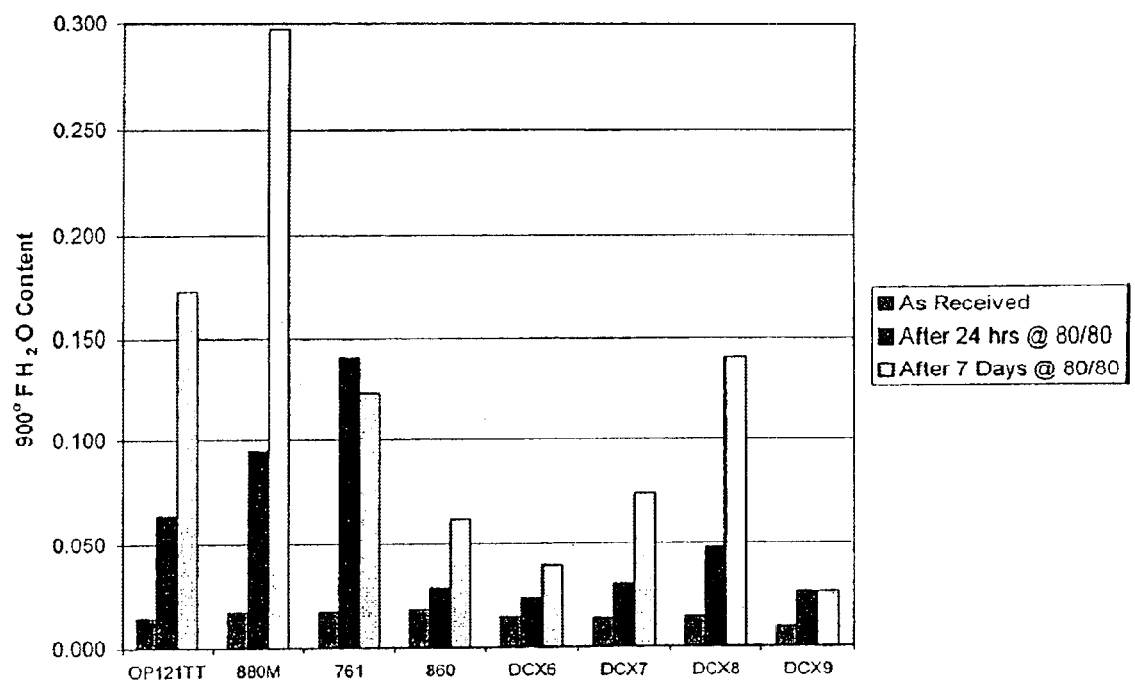

As illustrated in Table A, all the flux systems which included water glass as the principle binder exhibited significant moisture absorption during the two moisture tests. The flux systems which included colloidal silica in combination with water glass in the binder exhibited very little moisture absorption during the testing period. The moisture absorption of the various fluxes is graphically illustrated in FIG. 6. In addition, the flux systems which included colloidal silica in the binder substantially maintained the same amount of carbon dioxide in the flux system during the testing period. The results set forth in Table A are illustrated in FIG. 6 reveal that flux systems containing the colloidal silica resist moisture absorption better than binders that are absent the colloidal silica, and further illustrate that the colloidal silica in the binder maintains the carbon dioxide content of the flux system over an expended period of time.

Figure 4:
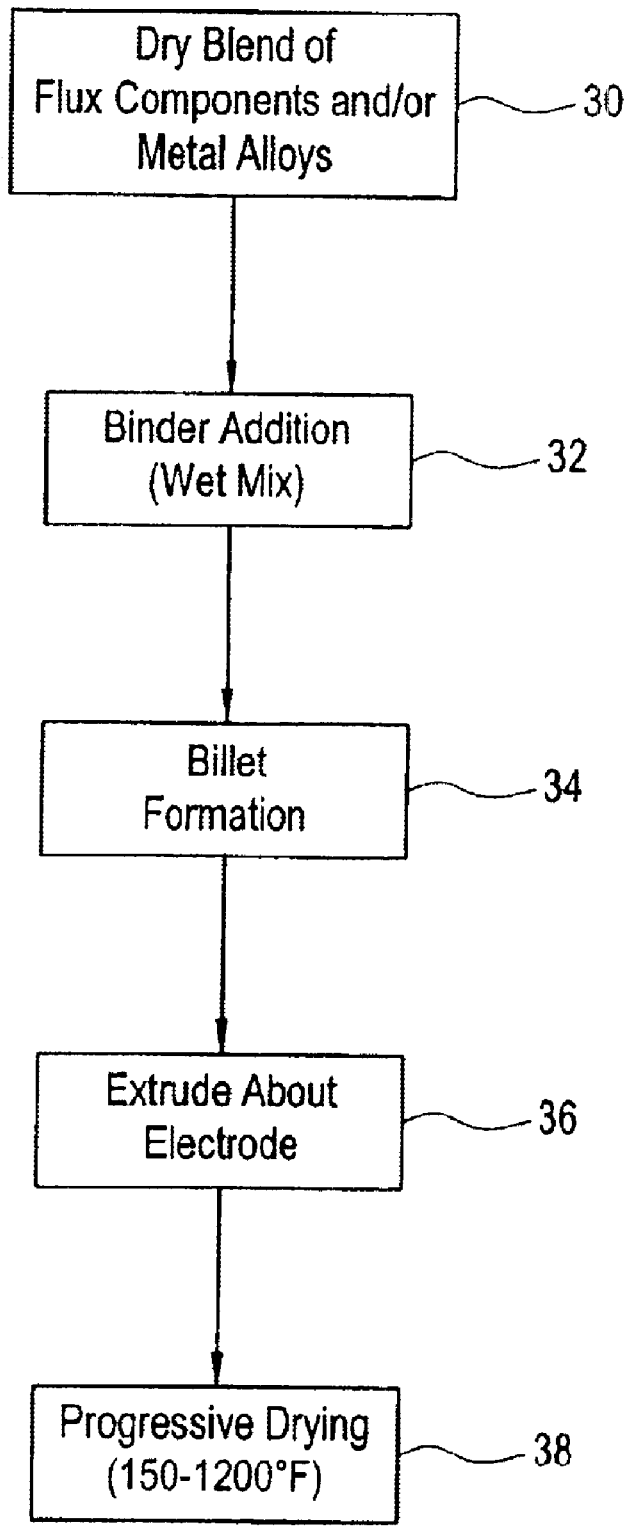
FIG. 4 illustrates a flowchart for making the flux system of the present system and then forming a flux coated electrode.

Referring now to FIG. 4, a process for forming a coated electrode is illustrated. A dry blend of flux components and/or metal alloying agents 30 is prepared or obtained. The size of the flux components and/or metal alloying agents is adjust as desired. Typically, the average size of the flux components and/or metal alloying agents is about 100–400 mesh. The flux components and/or metal alloying agents are then mixed with a wet binder 32 to form wet mix. As can be appreciated, the flux components can be first mixed with the binder and then metal alloying agents, or the metal alloying agents can be first mixed with the binder and then the flux components, or any other mixing order. The binder includes a colloidal binder having small particles of silicon dioxide. The colloidal binder is the same or similar to the colloidal binder described above. The binder can be made up of 100 weight percent colloidal binder to form a binder arrangement similar to that illustrated in FIG. 1, or can be made of part colloidal binder and part one or more other binders to form a binder arrangement similar to that illustrated in FIG. 2. When the colloidal binder is combined with one or more another binders, the other binder typically includes water glass. The colloidal binder can constitute anywhere from about 0.01–99.99 weight percent of the binder when forming a fraction of the binder. When the binder is formed principally of water glass and colloidal binder, the colloidal binder typically forms about 5–75 weight percent of the binder and more typically about 20–50 weight percent of the binder. The inclusion of water glass and/or other binder with the colloidal binder will typically depend on the desired flux composition.

Once the binder and the flux components and/or alloying agents have been properly mixed together, the wet mix is formed in a billet in billet formation step 34. The billet is typically shaped into a large cylindrical configuration having a diameter of about 3–30 inches and a height of about 10–40 inches, and typically about 12 inches in diameter and about 14 inches high. The process for forming a billet is well known, thus will not be further described herein. The billet is then placed into an extruder that extrudes a controlled amount of flux system about the surface of an electrode as illustrated in process step 36. The extruder and process for extruding a flux system about an electrode is well known, thus will not be further described herein. The coated wire is thereafter progressively dried as illustrated in process step 38. The drying temperature typically begins at a lower temperature (e.g., 65° F.) and progressively increases in temperature to a maximum temperature (e.g., 649° F.) as the coated wire is slowly moved through a drying chamber or oven. As can be appreciated; higher or lower drying temperatures can be used. As can further be appreciated, the drying temperature does not have to continuously increase during the drying of the flux system, but can be maintained the same temperature or periodical decrease in temperature. The drying time is typically several hours and generally depends on the amount of moisture in the flux system prior to drying and the desired moisture content at the end of drying. The apparatus for drying is well known, thus will not be further described herein.

In summary, the flux system formed with the colloidal binder exhibits several advantages over past binders such as, but not limited to:

- The novel binder has excellent resistance to moisture pickup after being dried.
- The novel binder can be dried/set at lower temperatures, thus allowing for a larger number of flux components to be used in the flux system
- The novel binder at least partially binds one or more flux components by a chemical process
- The novel binder can be dried/set at low or high temperatures
- The novel binder forms a strong bond with a wire electrode when coated on the surface of the wire electrode
- The formed flux system including the novel binder resists cracking
- The novel binder can be dried and crushed in by standard techniques
- The novel binder can be combined with other binders or be used as the sole binder for a flux system
- The novel binder reduces the need to add lower melting point components to the flux system (e.g., potassium and/or sodium silicates)
- The novel binder forms a flux system that has improved flowability characteristics
- The novel binder eliminates the need to use organic binders that have typically been used when lower drying/setting temperature are required
- The novel binder can be used to form flux systems for submerged arc fluxes, fluxes coated onto an electrode, and/or fluxes used in a flux cored electrode
- The novel binder can reduce in the hydrolyzation of oxides in the flux system
- The novel binder can reduce the formation of hexavalent chromium, thus making the flux system more environmentally friendly
- The flux system using the novel binder can be ground to finer particle sizes These and other modifications of the discussed embodiments, as well as other embodiments of the invention, will be obvious and suggested to those skilled in the art from the disclosure herein, whereby it is to be distinctly understood that the foregoing descriptive matter is to be interpreted merely as illustrative of the present invention and not as a limitation thereof.

I claim:

1. A welding flux having an average flux particle size and a moisture content comprising a flux agent and a binder, said flux agent including a compound selected from the group consisting of metal oxide, metal fluoride, metal carbonate or mixtures thereof; said binder constituting at least about 5 weight percent of said welding flux, said binder including a colloidal binder, said colloidal binder at least partially formed from small solid particles, said small solid particles including silicon dioxide wherein said moisture content is less than about 1%.

2. The welding flux as defined in claim 1, wherein said binder includes at least about 10 weight percent colloidal binder.

3. The welding flux as defined in claim 2, wherein said binder includes at least about 30 weight percent colloidal binder.

4. The welding flux as defined in claim 3, wherein said binder includes at least about 50 weight percent colloidal binder.

5. The welding flux as defined in claim 4, wherein said binder includes about 100 weight percent colloidal binder.

6. The welding flux as defined in claim 1, wherein said colloidal binder includes a liquid and said small solid particles prior to fully drying said binder, said small solid particles constituting at least about 5 weight percent of said colloidal binder.

7. The welding flux as defined in claim 2, wherein said colloidal binder includes a liquid and said small solid particles prior to fully drying said binder, said small solid particles constituting at least about 5 weight percent of said colloidal binder.

8. The welding flux as defined in claim 6, wherein said colloidal binder includes a liquid and said small solid particles prior to fully drying said binder, said small solid particles constituting at least about 10 weight percent of said colloidal binder.

9. The welding flux as defined in claim 3, wherein said colloidal binder includes a liquid and said small solid particles prior to fully drying said binder, said small solid particles constituting at least about 10 weight percent of said colloidal binder.

10. The welding flux as defined in claim 8, wherein said colloidal binder includes a liquid and said small solid particles prior to fully drying said binder, said small solid particles constituting about 30 weight percent of said colloidal binder.

11. The welding flux as defined in claim 9, wherein said colloidal binder includes a liquid and said small solid particles prior to fully drying said binder, said small solid particles constituting about 30 weight percent of said colloidal binder.

12. The welding flux as defined in claim 5, wherein said colloidal binder includes a liquid and said small solid particles prior to fully drying said binder, said small solid particles constituting about 30 weight percent of said colloidal binder.

13. The welding flux as defined in claim 1, wherein said small solid particles include at least about 10 weight percent silicon dioxide.

14. The welding flux as defined in claim 7, wherein said small solid particles include at least about 10 weight percent silicon dioxide.

15. The welding flux as defined in claim 13, wherein said small solid particles include at least about 30 weight percent silicon dioxide.

16. The welding flux as defined in claim 9, wherein said small solid particles include at least about 30 weight percent silicon dioxide.

17. The welding flux as defined in claim 15, wherein said small solid particles include about 100 weight percent silicon dioxide.

18. The welding flux as defined in claim 12, wherein said small solid particles include about 100 weight percent silicon dioxide.

19. The welding flux as defined in claim 6, wherein said liquid includes water.

20. The welding flux as defined in claim 14, wherein said liquid includes water.

21. The welding flux as defined in claim 15, wherein said liquid includes water.

22. The welding flux as defined in claim 18, wherein said liquid includes water.

23. A welding flux having an average flux particle size and a moisture content comprising a flux agent and a binder, said flux agent including a compound selected from the group consisting of metal oxide, metal fluoride, metal carbonate or mixtures thereof; said binder constituting at least about 5 weight percent of said welding flux, said binder including a colloidal binder, said colloidal binder at least partially formed from small solid particles, said small solid particles including silicon dioxide, said small solid particles having an average particle size of less than about 100 nm.

24. A welding flux having an average flux particle size and a moisture content comprising a flux agent and a binder, said flux agent including a compound selected from the group consisting of metal oxide, metal fluoride, metal carbonate or mixtures thereof; said binder constituting at least about 5 weight percent of said welding flux, said binder including at least about 10 weight percent colloidal binder, said colloidal binder at least partially formed from small solid particles, said colloidal binder including a liquid and said small solid particles prior to fully drying said binder, said small solid particles constituting at least about 5 weight percent of said colloidal binder said small solid particles including at least about 10 weight percent silicon dioxide, said small solid particles having an average particle size of less than about 100 nm.

25. The welding flux as defined in claim 23, wherein said small solid particles have an average particle size of less than about 50 nm.

26. A welding flux having an average flux particle size and a moisture content comprising a flux agent and a binder, said flux agent including a compound selected from the group consisting of metal oxide, metal fluoride, metal carbonate or mixtures thereof; said binder constituting at least about 5 weight percent of said welding flux, said binder including a colloidal binder, said colloidal binder at least partially formed from small solid particles, said colloidal binder including a liquid and said small solid particles prior to fully drying said binder, said liquid including water, said small solid particles include at least about 30 weight percent silicon dioxide, said small solid particles including silicon dioxide, said small solid particles have an average particle size of less than about 100 nm.

27. The welding flux as defined in claim 25, wherein said small solid particles have an average particle size of about 2–25 nm.

28. A welding flux having an average flux particle size and a moisture content comprising a flux agent and a binder, said flux agent including a compound selected from the group consisting of metal oxide, metal fluoride, metal carbonate or mixtures thereof said binder constituting at least about 5 weight percent of said welding flux, said binder including at least about 10 weight percent colloidal binder, said colloidal binder at least partially formed from small solid particles, said small solid particles including silicon dioxide, said colloidal binder including a liquid and said small solid particles prior to fully drying said binder, said small solid particles constituting about 30 weight percent of said colloidal binder, said small solid particles including at least about 30 weight percent silicon dioxide, said liquid including water, said small solid particles have an average particle size of less than about 100 nm.

29. The welding flux as defined in claim 1, wherein said average flux particle size is less than about 48 mesh.

30. The welding flux as defined in claim 24, wherein said average flux particle size is less than about 48 mesh.

31. The welding flux as defined in claim 29, wherein said average flux particle size is less than about 100 mesh.

32. The welding flux as defined in claim 26, wherein said average flux particle size is less than about 100 mesh.

33. The welding flux as defined in claim 28, wherein said average flux particle size is less than about 100 mesh.

34. The welding flux as defined in claim 30, wherein said moisture content is less than about 1%.

35. The welding flux as defined in claim 32, wherein said moisture content is less than about 1%.

36. The welding flux as defined in claim 34, wherein said moisture content is less than about 0.6%.

37. The welding flux as defined in claim 33, wherein said moisture content is less than about 0.6%.

38. The welding flux as defined in claim 1, wherein said flux agent includes metal alloys selected from the group consisting of aluminum, magnesium, titanium or mixtures thereof.

39. The welding flux as defined in claim 34, wherein said flux agent includes metal alloys selected from the group consisting of aluminum, magnesium, titanium or mixtures thereof.

40. The welding flux as defined in claim 35, wherein said flux agent includes metal alloys selected from the group consisting of aluminum, magnesium, titanium or mixtures thereof.

41. The welding flux as defined in claim 37, wherein said flux agent includes metal alloys selected from the group consisting of aluminum, magnesium, titanium or mixtures thereof.

42. The welding flux as defined in claim 1, wherein said binder includes a mixture of said colloidal binder and a metal silicate, said mixture constituting at least about 80 weight percent of said binder, said metal silicate including potassium silicate, sodium silicate or mixtures thereof.

43. The welding flux as defined in claim 39, wherein said binder includes a mixture of said colloidal binder and a metal silicate, said mixture constituting at least about 80 weight percent of said binder, said metal silicate including potassium silicate, sodium silicate or mixtures thereof.

44. The welding flux as defined in claim 40, wherein said binder includes a mixture of said colloidal binder and a metal silicate, said mixture constituting at least about 80 weight percent of said binder, said metal silicate including potassium silicate, sodium silicate or mixtures thereof.

45. The welding flux as defined in claim 41, wherein said binder includes a mixture of said colloidal binder and a metal silicate, said mixture constituting at least about 80 weight percent of said binder, said metal silicate including potassium silicate, sodium silicate or mixtures thereof.

46. A welding flux binder comprising a colloidal mixture, said colloidal mixture including a liquid and at least about 20 weight percent small particles, said liquid including water, said small particles including at least about 30 weight percent silicon dioxide, said small particles having an average particle size of less than about 100 nm.

47. The welding flux binder as defined in claim 46, wherein said colloidal mixture constitutes at least about 10 weight percent of said welding flux binder.

48. The welding flux binder as defined in claim 47, wherein said colloidal mixture constitutes at least about 30 weight percent of said welding flux binder.

49. The welding flux binder as defined in claim 48, wherein said colloidal mixture constitutes at least about 50 weight percent of said welding flux binder.

50. The welding flux binder as defined in claim 49, wherein said colloidal mixture constitutes about 100 weight percent of said welding flux binder.

51. The welding flux binder as defined in claim 46, wherein said small particles constitute at least about 50 weight percent silicon dioxide.

52. The welding flux binder as defined in claim 48, wherein said small particles constitute at least about 50 weight percent silicon dioxide.

53. The welding flux binder as defined in claim 51, wherein said small particles constitute about 100 weight percent silicon dioxide.

54. The welding flux binder as defined in claim 50, wherein said small particles constitute about 100 weight percent silicon dioxide.

55. The welding flux binder as defined in claim 46, wherein said solid particles constitute at least about 30 weight percent of said colloidal mixture.

56. The welding flux binder as defined in claim 52, wherein said solid particles constitute at least about 30 weight percent of said colloidal mixture.

57. The welding flux binder as defined in claim 54, wherein said solid particles constitute at least about 30 weight percent of said colloidal mixture.

58. The welding flux binder as defined in claim 46, wherein said average particle size of said small particles is less than about 50 nm.

59. The welding flux binder as defined in claim 56, wherein said average particle size of said small particles is less than about 50 nm.

60. The welding flux binder as defined in claim 58, wherein said average particle size of said small particles is less than about 2–25 nm.

61. The welding flux binder as defined in claim 57, wherein said average particle size of said small particles is less than about 2–25 nm.

62. The welding flux binder as defined in claim 46, including a mixture of said colloidal binder and a metal silicate, said mixture constituting at least about 80 weight percent of said binder, said metal silicate including potassium silicate, sodium silicate or mixtures thereof.

63. The welding flux binder as defined in claim 59, including a mixture of said colloidal binder and a metal silicate, said mixture constituting at least about 80 weight percent of said binder, said metal silicate including potassium silicate, sodium silicate or mixtures thereof.

64. The welding flux binder as defined in claim 61, including a mixture of said colloidal binder and a metal silicate, said mixture constituting at least about 80 weight percent of said binder, said metal silicate including potassium silicate, sodium silicate or mixtures thereof.

65. A method of forming a flux system having a low water content and which resists moisture absorption comprising:

forming a flux binder, said flux binding including a colloidal mixture, said colloidal mixture including a liquid and at least about 20 weight percent small particles, said liquid including water, said small particles including at least about 10 weight percent silicon dioxide, said small particles having an average particle size of less than about 100 nm;

mixing said flux binder with flux ingredients to form a flux mixture, said flux ingredients including a flux agent selected from the group consisting of metal oxide, metal fluoride, metal carbonate or mixtures thereof; and, drying said flux mixture at a temperature of at least about 400° C. for at least about 30 minutes until a moisture content of said flux blend is less than about 1%.

66. The method as defined in claim 65, including the step of grinding said dried flux mixture to an average particle size of less than about 48 mesh.

67. The method as defined in claim 66, including the step of grinding said dried flux mixture to an average particle size of less than about 100 mesh.

68. The method as defined in claim 65, wherein said ground flux mixture is a submerged arc flux or a flux for a cored electrode.

69. The method as defined in claim 65, including the step of extruding said flux mixture about a metal electrode prior to drying said flux mixture.

70. The method as defined in claim 65, wherein said moisture content of said flux blend is less than about 0.6%.

71. The method as defined in claim 70, wherein said moisture content of said flux blend is less than about 0.2%.

72. The method as defined in claim 65, wherein said flux ingredients include metal alloys selected from the group consisting of aluminum, magnesium, titanium or mixtures thereof.

73. The method as defined in claim 65, wherein said flux binder includes a mixture of said colloidal binder and a metal silicate, said mixture constituting at least about 80 weight percent of said flux binder, said metal silicate including potassium silicate, sodium silicate or mixtures thereof.

74. The method as defined in claim 65, wherein said binder includes at least about 10 weight percent colloidal binder.

75. The method as defined in claim 74, wherein said binder includes at least about 30 weight percent colloidal binder.

76. The method as defined in claim 75, wherein said binder includes at least about 50 weight percent colloidal binder.

77. The method as defined in claim 76, wherein said binder includes about 100 weight percent colloidal binder.

78. The method as defined in claim 65, wherein said small particles constitute about 30 weight percent of said colloidal binder.

79. The method as defined in claim 65, wherein said small particles include at least about 30 weight percent silicon dioxide.

80. The method as defined in claim 79, wherein said small particles include about 100 weight percent silicon dioxide.

81. The method as defined in claim 65, wherein said small particles have an average particle size of less than about 50 nm.

82. The method as defined in claim 81, wherein said small particles have an average particle size of about 2–25 nm.

83. The method as defined in claim 65, wherein said moisture content is less than about 0.6%.

* * * * *